United States Patent [19]

Kupcikevicius

[11] Patent Number: 4,486,939
[45] Date of Patent: Dec. 11, 1984

[54] METHOD AND APPARATUS FOR ATTACHING FLEXIBLE MEMBRANES TO A RIGID BACKING

[75] Inventor: Vytautas Kupcikevicius, Chicago, Ill.

[73] Assignee: Union Carbide Corporation, Danbury, Conn.

[21] Appl. No.: 430,229

[22] Filed: Sep. 30, 1982

[51] Int. Cl.³ .................... B21D 39/00; B23P 19/02
[52] U.S. Cl. ...................... 29/509; 29/235; 29/507
[58] Field of Search ............ 29/509, 515, 507, 464, 29/243.5, 421 R, 235

[56] References Cited

U.S. PATENT DOCUMENTS

| | | |
|---|---|---|
| 985,328 | 2/1911 | Decker . |
| 2,299,611 | 10/1942 | Clark ............................ 138/30 |
| 2,511,481 | 6/1950 | Schneider ...................... 229/14 |
| 2,751,073 | 6/1956 | Sheeran ......................... 206/46 |
| 3,300,102 | 1/1967 | Budzich ....................... 222/386.5 |
| 3,323,206 | 6/1967 | Clark ............................. 29/509 |
| 3,779,419 | 12/1973 | Heitz ............................. 220/63 |
| 4,045,860 | 9/1977 | Winckler ........................ 29/451 |
| 4,100,717 | 7/1978 | Kontinen ....................... 29/235 |
| 4,153,155 | 5/1979 | Benno .......................... 206/150 |
| 4,198,365 | 4/1980 | Pelton ........................... 264/249 |
| 4,233,726 | 11/1980 | Williams ......................... 29/507 |

Primary Examiner—Howard N. Goldberg
Assistant Examiner—Steven E. Nichols
Attorney, Agent, or Firm—Roger Aceto

[57] ABSTRACT

A method and apparatus for joining an end of a flexible membrane to a rigid backing. A sleeve is used which plants a portion of the membrane and a resilient member in a seat, preformed along an edge of the backing. A punch associated with the sleeve then forms the edge over the resilient member to capture the member and membrane in the seat and at the same time severs any excess portion of membrane along the edge. In one embodiment the membrane is a tube having an end joined to an annular backing about the opening in the backing.

14 Claims, 9 Drawing Figures

FIG. 7
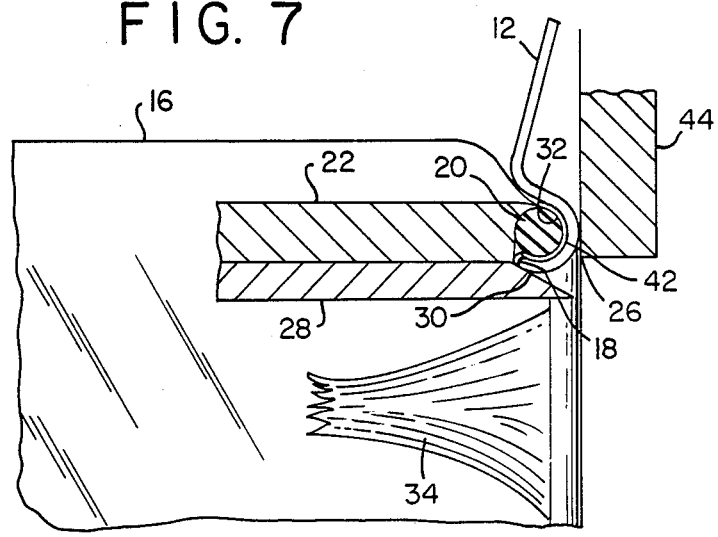
FIG. 8
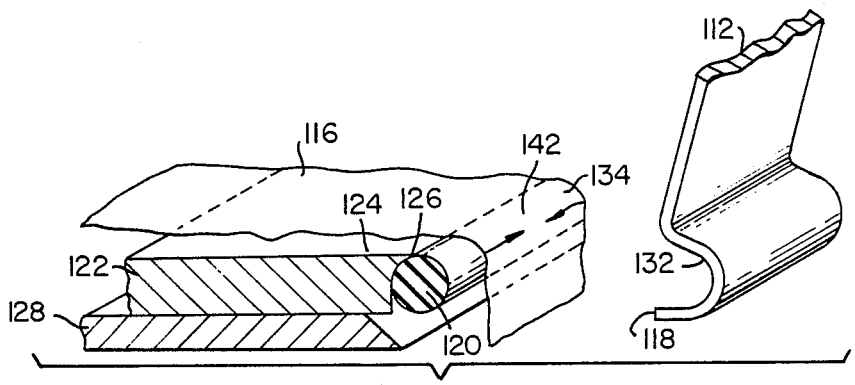
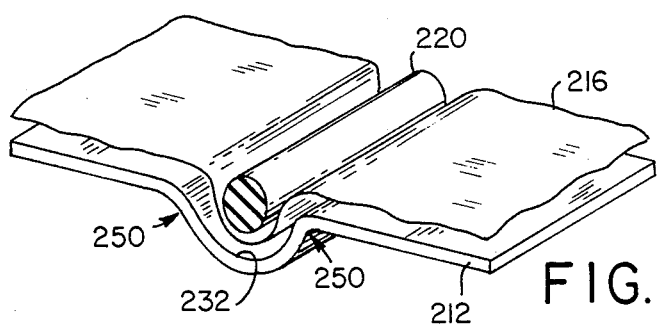
FIG. 9

METHOD AND APPARATUS FOR ATTACHING FLEXIBLE MEMBRANES TO A RIGID BACKING

BACKGROUND OF THE INVENTION

The present invention relates generally to a method and apparatus for joining a flexible membrane to a rigid backing. More particularly, the invention relates to the method and apparatus for mechanically effecting a connection between a flexible plastic sheet or tube and a metal backing.

Various applications require the joining of a flexible membrane such as a thin plastic sheet, tube or the like to a more rigid member such as sheet metal, either in the form of flat stock or preformed to a container shape. For example, plastic bladders or bags are often inserted into metal containers with the bladder or bag opening being joined to the container rim. Where the plastic merely is to serve as a protective or decorative overlay, it may be desirable to seal the plastic sheet along its edges to the edge or rim of flat metal stock.

In preferred use, the method of the present invention is used to join the ends of a flexible tubular membrane to rigid, metallic end plates and in particular to end plates which are annular, the ends of the tubular membrane being attached about the opening in each end plate. The article thus formed is utilized as an extender module for the production of flat-ended, stuffed casing food products. Such an article is more particularly described in a copending patent application Ser. No. 430,442.

Several difficulties must be overcome when attempting to join a thin, flexible material such as a plastic membrane or the like to a rigid, metallic backing. For example, if a mechanical connection is to be made by crimping or forming an edge of the backing over an edge of the membrane, it may be necessary to over-bend or over-crimp the metal to compensate for the tendency of the metal to spring back when the crimping force is released. Accordingly, care must be taken to prevent this operation from tearing or cutting the membrane.

Another problem to be solved involves aligning or otherwise maintaining the edge of the flexible membrane properly oriented to the edge of the backing.

In the manufacture of an extender module as described in Ser. No. 430,442, the problems of orientation, positioning and crimping are rendered more acute because the flexible membrane is tubular and because each end of the tubular membrane is to be joined about the perimeter of an opening extending through an annular metal end plate. Moreover, the diameter of the tubular membrane is greater than the diameter of the opening through the metal plate.

In the present invention, the problem of positioning and orienting the flexible membrane sheet is solved by first forming a seat along an edge of the metal backing and then placing the membrane across this seat so that a tail or excess portion of the membrane overhangs the edge of the seat. Then, when the edge of the seat is rolled or crimped to capture the membrane, only this excess material or tail is sheared off along the edge of the seat to form a clean, neat appearing connection.

Properly positioning and orienting the flexible membrane preferably is accomplished by laying the membrane over the end of a movable member so as to provide an excess or tail of membrane material at one side of the member. Movement of the movable member can then carry the membrane to the site of the attachment, plant the membrane in the seat, form an edge of the seat over the membrane, and sever the excess or tail of membrane material.

The problem of cutting or tearing the membrane during crimping is solved by placing a bead of resilient material, such as a cord or monofilament of polyethylene or the like on the membrane. The edge of the metallic member is then crimped or formed over this bead to capture the edge of the membrane to the metallic backing. Due to the resiliency of the bead, a capture is made without the need to tightly crimp the edge of the metallic member thereby greatly reducing the likelihood of cutting or tearing the membrane. Also, during the crimping operation the excess portion of the membrane is sheared off to provide a clean, neat appearing connection.

In a preferred method, the monofilament is placed on the working end of a movable member and then the flexible membrane is draped over the monofilament. In this fashion the movable member can be used to plant the membrane into the seat, place the monofilament line against the membrane and into the seat, crimp or roll the edge of the seat over the monofilament line, and sever the excess membrane along the crimped edge.

In the case of joining a tubular membrane about an opening in a metallic plate, preferably a hollow punch is slidably disposed within a movable sleeve. One end of the sleeve is inserted part way through the tubular membrane and air is evacuated from the other end of the sleeve. This draws an end of the tubular membrane over the end of the sleeve and into the bore of the punch. The sleeve and punch are then advanced towards the metallic plate to plant the membrane into the seat at the site of the joint and to crimp and roll the edge of the plate over the membrane.

SUMMARY OF THE PRESENT INVENTION

The method of the present invention may be characterized in one aspect thereof by first forming a seat in a metallic backing, placing a flexible sheet material over the seat, placing a resilient member on top of the flexible sheet and into the seat, and thereafter closing the seat against the resilient member to capture the sheet material in the seat and between the resilient member and the backing.

In another aspect, the method of the present invention may be characterized by the steps of: providing a backing piece having a seat formed about an opening in the piece, wherein the inner peripheral edge of the piece which defines the opening also defines an edge of the seat; placing a resilient member on the end of a sleeve, the resilient member being of a size to fit into the seat; inserting the sleeve part way through a flexible tubular membrane which is to be joined to the backing piece; evacuating air from the other end of the sleeve to suck a portion of the tubular membrane into the bore of the sleeve so as to drape an excess portion of the membrane over the end of the sleeve and the resilient member; moving the sleeve towards the seat to plant both the membrane and resilient member in the seat; and, thereafter, extending a metal forming member through the sleeve to engage and form the edge of the seat over and against the resilient member, thereby severing the draped excess portion of membrane material and capturing the remaining portion of membrane material between the resilient member and the seat.

The apparatus of the present invention can be characterized by: a sleeve having an end face adapted to fit into a tubular flexible membrane; a tubular punch slidably disposed within the sleeve for movement through the end face of the sleeve; means on the end face of the sleeve for releasably carrying an annular resilient member; evacuating means for evacuating air from within the sleeve to draw a drape of the flexible tubular membrane over the end face of the sleeve and into the bore of the tubular punch. The sleeve is adapted to move so as to plant the membrane and resilient member in a seat formed about the central opening of an annular metal disc, and the punch is movable through the end face of the sleeve and into the opening of the annular disc so as to shear any excess portion of the membrane along the edge of the seat, and at the same time to crimp the inner periphery of the disc over the resilient member to capture both the resilient member and the tubular membrane in the seat.

DESCRIPTION OF THE DRAWINGS

FIG. 7 is a view on an enlarged scale showing the apparatus and method of the present invention at the final step of the method; and FIGS. 8 and 9 are perspective views showing other embodiments of the invention.

DESCRIPTION OF THE PREFERRED EMBODIMENT

Figure 1:
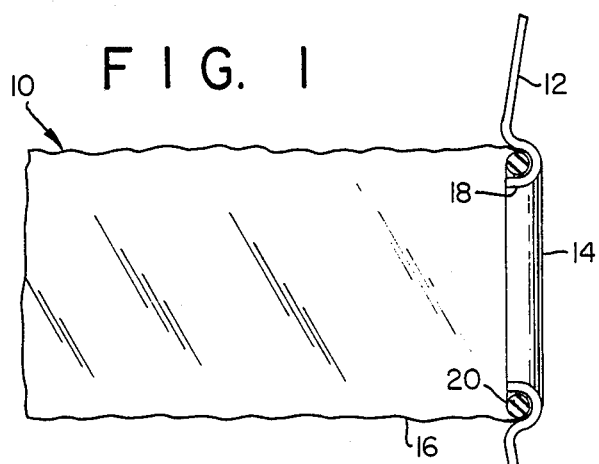
FIG. 1 is a side elevation view, in section showing an article manufactured by the method and apparatus of the present invention.

Referring to the drawings, FIG. 1 shows an article made by the method and apparatus of the present invention. The article, generally indicated at 10, is more particularly described in a copending application Ser. No. 430,442.

Briefly, the article includes a relatively stiff metal disc or backing piece 12 having a central opening 14. Attached to the backing about the central opening is one end of a flexible tubular membrane 16.

It should be appreciated that the article as described herein should, in no way, limit the method and apparatus of the present invention. The article described merely illustrates one type of article wherein a flexible membrane or sheet material, either as flat or tubular stock is joined to a more rigid backing, such as a metallic member. In the article as shown, the membrane is joined along the inner peripherial edge 18 of the backing piece which defines opening 14.

In practicing the method, edge 18 of the backing is crimped or otherwise formed over the end of the membrane in order to anchor or capture the membrane to the backing. To prevent damage to the membrane during the anchoring step, edge 18 is formed over a resilient member 20, such as an o-ring, a polyethelene monofilament, or other suitable resilient material. As shown in FIG. 1, an end of the flexible membrane is captured between this resilient member 20 and the backing so the resilient member 20 separates the membrane from edge 18 to prevent the edge from cutting or otherwise damaging the membrane during the crimping process.

Figure 2:
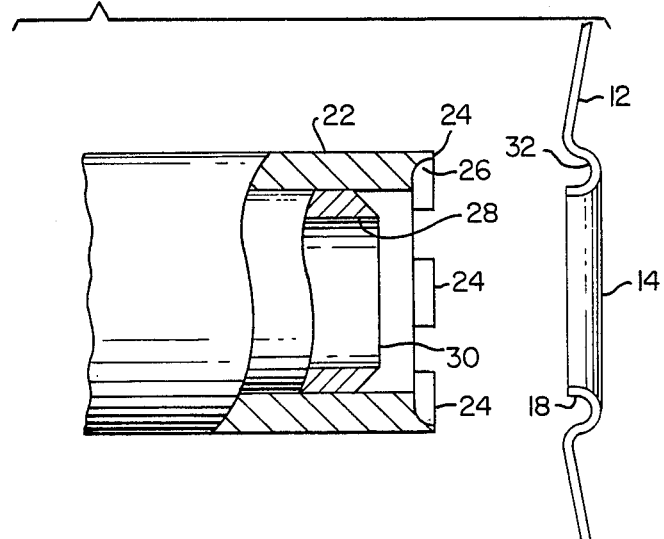
FIG. 2 is a side elevation view, partly broken away and in section showing the relationship of the apparatus of the present invention to a portion of the article to be manufactured.

FIG. 2 shows the apparatus for joining the membrane to the rigid backing in accordance with the present invention. The apparatus, as described herein, is for making the article as shown in FIG. 1, wherein a tubular membrane has an end attached about the opening in an annular rigid backing. Accordingly, it will be necessary to describe the apparatus in terms of "tubular" or "annular" members. However, adaptation of the apparatus for anchoring a flexible membrane along a linear edge would be well within the skill of the art, and one such adaptation will be described as an alternate embodiment of the apparatus.

In FIG. 2, the apparatus is shown to include a tubular sleeve 22 having an end face 24. On end face 24 are a plurality of holder or gripping means 26 spaced about the outer periphery of the end face. Slidably disposed within the tubular sleeve is a tubular punch 28. Punch 28 has a working end 30, for crimping or forming the backing over the resilient member 20 (FIG. 1) as further described herein below.

FIG. 2 also shows that prior to attaching the membrane, annular backing 12 has a seat 32 preformed along edge 18 (i.e. the inner periphery) of the backing. Flexible membrane 16 of FIG. 1 will be captured in this seat as further described herein below.

In the case of an annular article as shown in FIG. 1, the outside diameter of punch 28 should be slightly larger than the inside diameter of opening 14 and the diameter of the holder 26 should be about the same size as the diameter of seat 32. With this arrangement, the holder and seat can be axially aligned as shown in FIG. 2. Thereafter, sleeve 22 can be moved axially towards the backing so that a resilient member 20 held on the end face 24 of the sleeve can be planted in seat 32.

Figure 3:
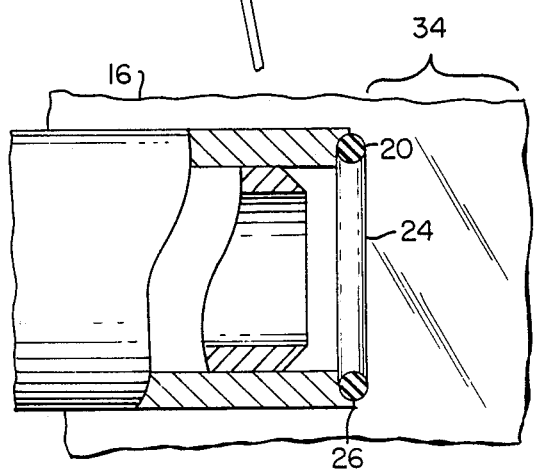
FIG. 3 is a view showing the apparatus at one step of the method of the present invention.

A resilient member 20, in the form of an O-ring or other suitable resilient member, is placed into the holder 26 on the working end face of the sleeve 22 (FIG. 3). It has been found that a polyethylene cord cut to the proper length and placed within holder 26 will provide the desired results. A proper length is one in which the ends of the cord do not overlap when said cord is bent to a circular configuration. When the cord is bent to a generally circular shape and placed in the holder, the tendency of the cord to spring open will act to hold the resilient member 20 in position on the end face of the sleeve.

After the resilient member is placed within the holder means 26, end face 24 of sleeve 22 is inserted into the tubular membrane 16. As shown in FIG. 3, the sleeve does not extend entirely through the tubular membrane. Instead, an excess portion 34 of the membrane is left to overhang end face 24.

Figure 4:
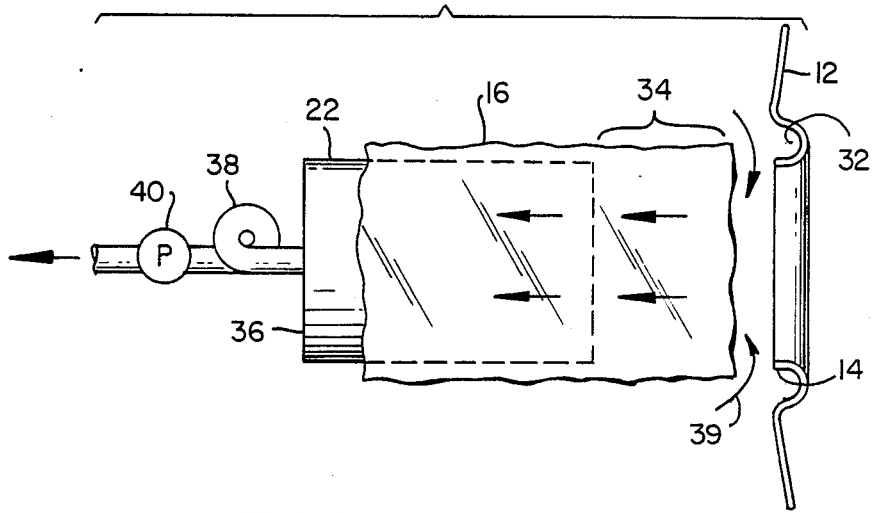
FIG. 4 is a schematic view, on a smaller scale showing the apparatus of the present invention.
Figure 5:
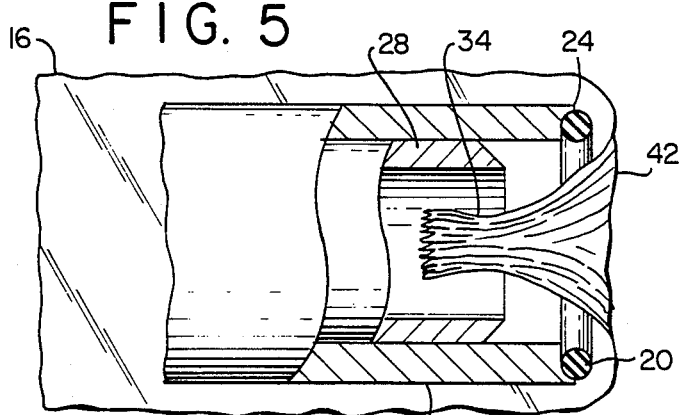
FIGS. 5 and 6 are views similar to FIG. 3 showing further steps of the method of the present invention.

The excess portion 34 of the membrane must be draped or extended over face 24 of the sleeve in order for the sleeve to plant the membrane into seat 32. For this purpose, FIG. 4 shows that the aft end 36 of the sleeve is connected by a flexible hose 38 to a fan or other suitable evacuating means 40. When the fan is operated to evacuate air from the bore of the sleeve, the excess portion 34 of the membrane is turned inward into its own bore, drawn over the end face of the sleeve, and sucked into the bore of the sleeve and punch in the direction as illustrated by the arrows 39. The result is shown in FIG. 5.

Sucking and inturning the end of the membrane into the bore of the sliding tubular punch 28 causes the membrane material indicated at 42 to drape over the resilient member 20 and the end face 24 of the sleeve. Sleeve 22 can now be moved towards the rigid backing so as to plant the membrane draped portion 42 and the resilient member 20 into the preformed seat 32. This is shown in FIG. 6.

To facilitate planting both resilient member 20 and membrane draped portion 42 into seat 32, a stop 44 preferably is positioned on the far side of the rigid backing 12 from sleeve 22 (FIG. 7).

Figure 6:
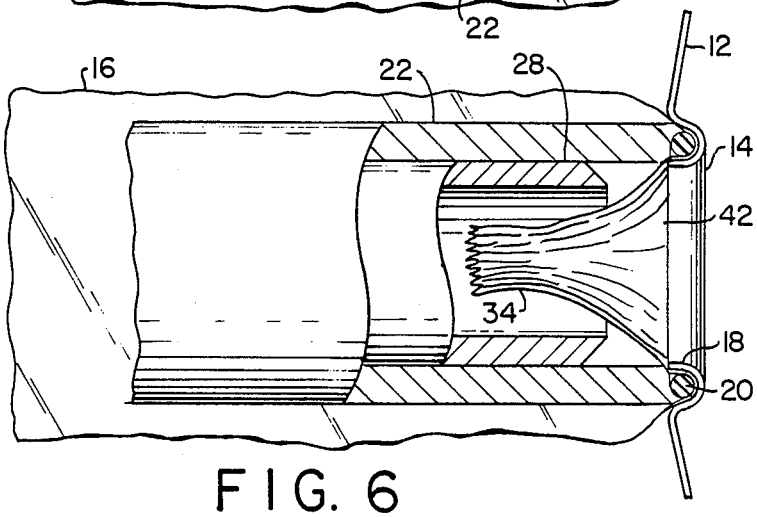

Sleeve 22 holds resilient member 20 and membrane draped portion 42 in the preformed seat 32, as shown in FIGS. 6 and 7, while punch 28 is moved through the end face 24 of the sleeve and against the edge 18 of seat 32. As shown in FIG. 7, sliding the punch in this fashion does two things. First the punch end 30, in moving past edge 18, shears off the excess portion of membrane material 34. In this respect the excess portion of the membrane is caught between the seat edge 18 and the sliding punch 28 in a shearing action. This shearing action trims away the exess portion along the edge 18 to form the clean, neat appearing attachment of the membrane to the rigid backing as shown in FIG. 1.

The second thing accomplished is that the punch engages seat edge 18 and crimps, rolls or otherwise forms this edge over resilient member 20. This slightly compresses the resilient member and captures it in the seat. Since the draped portion 42 of the membrane lies between the resilient member and the seat, capturing the resilient member also captures and anchors the flexible membrane to the seat. Due to the resiliency of member 20, membrane 16 can be anchored to the backing without the need to tightly crimp edge 18, thereby reducing the likelihood of damaging the portion of the membrane which extends from the seat.

With the resilient member captured in seat 32, moving the sleeve and punch away from the backing 12 releases resilient member 20 from the holder 26.

Articles as shown in FIG. 1 were made using the method and apparatus of the present invention, as described herein. In particular, a membrane of a thin (1½ to 5 mils) plastic film such as polyethylene was formed into a tube about 3 inches in diameter and cut to a tube length of about 5 inches. This tubular membrane was then attached to a 0.007 inch thick, tin-plated steel disc. The disc had a central opening measuring about 2 inches in diameter, and one end of the tubular membrane was attached about this opening. The resilient member 20 was a 0.050 inch diameter polyethylene cord.

Since the tubular membrane is three inches in diameter and the inside diameter of opening 14 is only two inches, the membrane is gathered in pleats or folds over the end face 24 of the sleeve when the excess portion of membrane material is drawn over end face 24 and into the bore of hollow sleeve 22. Later, during the crimping operation, the resiliency of member 20 will function to compensate for the varying thicknesses in the membrane material caused by the gathered pleats or folds, without destroying the integrity of the attachment.

While the method and apparatus of the present invention has been described as attaching an end of a tubular membrane to a rigid backing, it should be apparent that the invention can be adapted for attaching a membrane in sheet form to a rigid backing along a linear, as opposed to an annular, edge. This is shown in FIG. 8 wherein a flat plate 122 corresponds to sleeve 22. This flat plate has a holder 126 on its end face 124. The resilient member 120 in holder 126 could be a length of any suitable resilient material such as the polyethylene cord described hereinabove.

Instead of a sliding tubular punch, a sliding blade 128 can be used, the blade being arranged for movement relative to the plate and past the end face of the plate.

Also, as shown in FIG. 8, the flexible membrane 116 which is in sheet form, simply has an excess portion 134 of its length extending over the end face of the plate to form the drape, as indicated at 142. If desired, the edges of the membrane can be gathered inward (see arrows) so that the extent of the crimp attachment is shorter than the width of the membrane sheet 116. The preformed seat, as shown at 132 is, of course, a linearly extending seat formed along an edge 118 of the rigid backing piece 112.

In still another aspect, as shown in FIG. 9, a seat 232 can be formed across a plate 212. After laying the flexible membrane 216 on the surface of the plate and across seat 232, a length of the resilient member 220, such as a length of polyethylene cord, is placed against the sheet and into the seat. The sides of the seat can then be crimped closed by a force applied in the direction as shown by arrows 250 to capture the membrane.

Thus, it should be appreciated that the present invention does provide a method and apparatus for quickly, and easily attaching or otherwise anchoring, a flexible membrane along an edge of a rigid backing piece. The attachment is made in a manner which protects the captured end of the membrane so as to avoid tearing or damaging the membrane. The problems of properly orienting the membrane to the attachment site is avoided in part simply by providing an excess length of the membrane at the site. This excess amount is then severed by the attachment process to make a clean, neat appearing attachment.

Having thus described the invention in detail, what is claimed as new is:

1. A method of attaching a flexible membrane to a relatively stiff backing piece comprising the steps of:
   (a) placing a portion of said flexible membrane into a seat which has been formed along an edge of said stiff backing piece with an excess portion of said membrane overhanging said edge;
   (b) placing a resilient member against said membrane and into said seat;
   (c) forming said edge over said resilient member to capture said member in said seat with said membrane being attached to said backing piece by clamping between said resilient member and seat; and
   (d) shearing said excess portion of said membrane along said edge by said forming step.

2. A method as in claim 1 wherein said inturning step is accomplished by inserting a tubular sleeve into the bore of said tubular membrane so that one end portion of said membrane overhangs a first end of said sleeve and thereafter evacuating air from the other end of said sleeve to inturn and draw said one end portion of tubular membrane over said first sleeve end and into the bore of said tubular sleeve.

3. A method as in claim 2 wherein said resilient member is placed against said first sleeve end prior to inturning and drawing said one end portion of tubular membrane into the tubular bore of said sleeve.

4. A method as in claim 3 wherein said step of closing said seat is accomplished by a punch member slidably disposed within the bore of said tubular sleeve, said punch member sliding from said tubular sleeve and through said first sleeve end to form said seat edge over said resilient member.

5. A method as in claim 4 wherein said closing step also shears said folded portion of membrane along said edge.

6. A method of anchoring an end of a flexible tubular membrane to a rigid backing piece comprising the steps of:
   (a) providing said backing piece with an opening and a seat formed in said backing piece about said opening, the inner peripheral edge of said opening defining an edge of said seat;
   (b) placing an annular resilient member on an end face of a tubular sleeve, the mean diameter of said annular resilient member being substantially the same as the mean diameter of said seat so that said member can be received in said seat;
   (c) inserting said tubular sleeve partly through a tubular membrane to be anchored to said backing piece such that an excess portion of said tubular membrane extends over said sleeve end face;
   (d) inturning said excess portion of tubular membrane into the bore of said tubular sleeve and over said sleeve end face;
   (e) moving said sleeve towards and against said backing piece to plant said tubular membrane and resilient member in said seat; and
   (f) forming said edge over said resilient member to capture the said member and membrane in said seat with an end of said membrane being anchored between said resilient member and seat.

7. A method as in claim 6, including the step of severing said excess membrane portion along said edge of said seat.

8. A method as in claim 7, wherein said severing step and forming step are accomplished simultaneously.

9. A method as in claim 6 wherein inturning is accomplished by evacuating air from the bore of said tubular sleeve to draw said excess membrane portion over said sleeve end face and into the bore of said tubular sleeve.

10. Apparatus for anchoring an end of a flexible membrane to a seat formed along an edge of a rigid backing piece, said apparatus comprising:
    (a) a sleeve having a working end face, said sleeve being movable towards said seat;
    (b) a holder on said sleeve end face for releasably holding a resilient member placed in said holder, said end face being adapted to receive a portion of said membrane draped over both said end face and a resilient member in said holder;
    (c) said sleeve being movable towards said seat for planting said resilient member and the draped portion of flexible membrane into said seat; and
    (d) forming and severing means slidably associated with said sleeve and movable with respect to said end face for forming said edge over a resilient member planted in said seat by said sleeve and for severing said draped portion of flexible membrane along said edge.

11. Apparatus as in claim 10 wherein:
    (a) said flexible membrane is tubular and has an inside diameter larger than the outside diameter of said tubular sleeve so that said sleeve end face can be inserted into said membrane; and
    (b) means operably connected to a second end of said tubular sleeve for evacuating the bore thereof to draw a portion of said membrane over said sleeve end face and into said bore.

12. Apparatus as in claim 11 wherein said forming and severing means comprises a tubular punch slidably disposed in the bore of said tubular sleeve, one end of said punch being adapted for movement through said sleeve end face.

13. Apparatus for anchoring an end of a flexible tubular membrane in a seat formed about an opening in a backing piece, said apparatus comprising:
    (a) an axially movable tubular sleeve having an end face and a second end, said sleeve being adapted to have its end face inserted axially into said flexible tubular membrane;
    (b) a tubular punch slidably disposed within said tubular sleeve, said punch having a working end extending slidably through said sleeve end face;
    (c) means on said sleeve end face for carrying an annular resilient member;
    (d) evacuating means operatively connected to said second sleeve end for evacuating air from said tubular sleeve to draw a drape of said flexible tubular membrane over said sleeve end face and into the bore thereof;
    (e) means for moving said sleeve towards said seat to plant said drape of tubular membrane and said annular resilient member into said seat;
    (f) means for moving said punch axially with respect to said sleeve to slide the working end of said punch out of said sleeve and through the opening in said backing piece, said working end being adapted to engage and form the peripherial edge of said backing piece which defines said opening over said seat to capture said resilient member in said seat, and to sever from the membrane anchored between said resilient member and said seat, the drape of said tubular membrane extending into the bore of said sleeve.

14. A method of attaching a flexible tubular membrane to a relatively stiff backing piece comprising the steps of:
    (a) providing said backing piece with an opening, the inner periphery of said opening defining an edge of a seat formed in said backing piece about said opening;
    (b) inturning an end portion of said tubular membrane inward into the bore thereof to form a folded portion;
    (c) placing said folded portion into said seat;
    (d) placing a resilient member into said seat and against said membrane whereby said membrane lies between said seat and said resilient member; and
    (e) closing said seat against said resilient member to capture said resilient member in said seat with said membrane being attached to said backing piece by clamping between said resilient member and said seat.

* * * * *